(12) United States Patent
Woods, Jr.

(10) Patent No.: US 12,155,105 B2
(45) Date of Patent: Nov. 26, 2024

(54) TSV PHASE SHIFTER

(71) Applicant: GlaiveRF, Inc., Burlington, MA (US)

(72) Inventor: Wayne H. Woods, Jr., Burlington, MA (US)

(73) Assignee: GLAIVERF, INC., Burlington, MA (US)

( * ) Notice: Subject to any disclaimer, the term of this patent is extended or adjusted under 35 U.S.C. 154(b) by 487 days.

(21) Appl. No.: 17/358,345

(22) Filed: Jun. 25, 2021

(65) Prior Publication Data

US 2022/0416382 A1 Dec. 29, 2022

(51) Int. Cl.
*H01P 1/18* (2006.01)
*G02F 1/025* (2006.01)
*H04L 25/02* (2006.01)

(52) U.S. Cl.
CPC .............. *H01P 1/182* (2013.01); *G02F 1/025* (2013.01); *H04L 25/0272* (2013.01); *H04L 25/0278* (2013.01)

(58) Field of Classification Search
CPC ...... H01P 1/182; G02F 1/025; H04L 25/0272; H04L 25/0278
See application file for complete search history.

(56) References Cited

U.S. PATENT DOCUMENTS

| | | | |
|---|---|---|---|
| 5,949,369 A | 9/1999 | Bradley et al. | |
| 6,239,756 B1 | 5/2001 | Proctor, Jr. et al. | |
| 7,034,759 B2 | 4/2006 | Proctor, Jr. et al. | |
| 7,489,180 B2 | 2/2009 | Marshall | |
| 7,576,699 B2 | 8/2009 | Gilmore et al. | |
| 8,164,397 B2 | 4/2012 | Wang et al. | |
| 8,193,878 B2 | 6/2012 | Ding et al. | |
| 8,274,443 B2 | 9/2012 | Hauhe et al. | |
| 8,560,031 B2 | 10/2013 | Barnett et al. | |
| 8,643,562 B2 | 2/2014 | Chang et al. | |
| 8,749,020 B2 | 6/2014 | Chen et al. | |

(Continued)

FOREIGN PATENT DOCUMENTS

| CN | 103765674 | 4/2014 |
|---|---|---|
| WO | 2012101282 | 8/2012 |

OTHER PUBLICATIONS

Robson et al., "Electrically Programmable Fuse (eFUSE): From Memory Redundancy to Autonomic Chips", IEEE 2007 Custom Intergrated Circuits Conference (CICC), 2007, 6 pages.

(Continued)

*Primary Examiner* — Daniel C Puentes
(74) *Attorney, Agent, or Firm* — Andrew D. Wright; Calderon Safran & Wright P.C.

(57) ABSTRACT

A phase shifter includes functional actively controlled phase-shift elements formed with TSVs. The phase shifter may include plural phase shifter elements each including: a signal line including a signal line through-substrate-via (TSV) in a substrate; a ground return line including a ground return line TSV in the substrate; a capacitance control line including a capacitance control line TSV in the substrate; and an inductance control line including an inductance control line TSV in the substrate, wherein the phase shifter element has one of a first phase shift and a second phase shift, different from the first phase shift, based on a capacitance and an inductance of the signal line TSV.

26 Claims, 9 Drawing Sheets

(56) References Cited

U.S. PATENT DOCUMENTS

| | | | |
|---|---|---|---|
| 8,789,003 B1* | 7/2014 | Ding | G06F 30/373 |
| | | | 716/136 |
| 8,898,605 B2 | 11/2014 | Ding et al. | |
| 9,800,434 B2 | 10/2017 | Ding et al. | |
| 9,813,264 B2 | 11/2017 | Ding et al. | |
| 2013/0127564 A1 | 5/2013 | Ding et al. | |
| 2013/0328723 A1 | 12/2013 | Rappaport | |
| 2014/0118059 A1 | 5/2014 | Kim et al. | |
| 2015/0035714 A1 | 2/2015 | Zhou | |
| 2015/0069523 A1 | 3/2015 | Or-Bach et al. | |
| 2015/0348876 A1 | 12/2015 | Adkisson et al. | |
| 2017/0345738 A1 | 11/2017 | Edelstein et al. | |
| 2019/0013580 A1* | 1/2019 | Vigano | H01Q 3/2658 |
| 2019/0089434 A1 | 3/2019 | Rainish et al. | |
| 2019/0372199 A1 | 12/2019 | Haridas et al. | |
| 2020/0106192 A1 | 4/2020 | Avser et al. | |
| 2021/0083349 A1 | 3/2021 | Woods, Jr. | |

OTHER PUBLICATIONS

Woods et al., "CMOS Millimeter Wave Phase Shifter Based on Tunable Transmission Lines", IEEE, 2013, 4 pages.
Tousi et al., "A Ka-band Digitally-Controlled Phase Shifter with sub-degree Phase Precision", 2016 IEEE Radio Frequency Integrated Circuits Symposium, 2016, 4 pages.
Sadhu et al., "A 28-GHz 32-Element TRX Phased-Array IC With Concurrent Dual-Polarized Operation and Orthogonal Phase and Gain Control for 5G Communications", IEEE Journal of Solid-State Circuits, vol. 52, No. 12, Dec. 2017, 19 pages.
Chen, "The Benefits Of Antifuse OTP", Semiconductor Engineering, Dec. 19, 2016, 10 pages.
Benson, "Phased Array Beamforming ICs Simplify Antenna Design", Analog Devices, Jan. 2019, 4 pages.
Anonymous, "Phased Array Antenna", Radar Basics, http://www.radartutorial.eu/06.antennas/Phased%20Array%20Antenna.en.html, Accessed Aug. 15, 2019, 3 pages.
EDN, "Metal eFuse teardown", https://www.edn.com/metal-efuse-teardown/, Nov. 11, 2015, 2 pages.
Iyer, "Implementation of electrically programmable fuse (eFUSE) in CMOS technologies using electromigration", Extended Abstracts of the 2002 International Conference on Solid State Devices and Materials, Nagoya, 2002, 2 pages.
Naqvi et al., "Review of Recent Phased Arrays for Millimeter-Wave Wireless Communication", sensors, Sep. 21, 2018, 31 pages.
Bang et al., "MM-Wave Phased Array Antenna for Whole-Metal-Covered 5G Mobile Phone Applications", Department of Electronics and Computer Engineering, Hanyang University, 2017, 2 pages.
Zhou, "Phased Array for Millimeter-Wave Mobile Handset", Samsung Research America, 2014, 2 pages.
Unknown, "5G Millimeter Wave Frequencies And Mobile Networks", IWPC, Jun. 14, 2019, 203 pages.
Unknown, "Push-to-Close Latches with Pop-Out Knob", downloaded Jun. 25, 2020, 1 page.
Unkown, "Push-Button Tight-Hold Paddle-Handle Keyed Alike Cam Locks" downloaded Jun. 25, 2020, 1 page.
Hindle et al., "5G Phased Array Techonologies", Microwave Journal eBook, Sep. 2019, 37 pages.
International Search Report mailed Nov. 15, 2022, in International Application No. PCT/US22/34879, 4 pages.
Written Opinion of the International Searching Authority mailed Nov. 15, 2022, in International Application No. PCT/US22/34879, 5 pages.

* cited by examiner

TSV PHASE SHIFTER

BACKGROUND

The present invention relates generally to wireless communication systems and, more particularly, to a system that utilizes through-substrate-vias (TSVs) in phase shifter elements of a phased array antenna to achieve a desired direction of a beam formed by the phased array antenna.

Phase shifters are a component of phased array antenna systems which are used to directionally steer radio frequency (RF) beams for electronic communications or radar. A phased array antenna is a group of antennas in which the relative phases of the respective signals feeding the antennas are varied in such a way that the effective radiation pattern of the array is reinforced in a desired direction and suppressed in undesired directions. The relative amplitudes of, and constructive and destructive interference effects among, the signals radiated by the individual antennas determine the effective radiation pattern of the array. By controlling the radiation pattern through the constructive and destructive superposition of signals from the different antennas in the array, phased array antennas electronically steer the directionality of the antenna system, referred to as beam forming or beam steering. In such systems, the direction of the radiation (i.e., the beam) can be changed by manipulating the phase of the signal fed into each individual antenna of the array, e.g., using a phase shifter.

Beam steering advantageously increases the signal to noise ratio (SNR) of the antenna system up to an order of magnitude or more compared to antenna systems that do not employ beam steering. An increased SNR reduces the amount of power used by the antenna system to transmit the radiation to a receiving antenna, and also permits a higher bandwidth in communication. As a result, beam steering systems have become a focus of the next-generation wireless communication systems including 5G and 6G. For example, it is envisioned that 5G and 6G systems will utilize fixed-location base stations (e.g., antennas) that steer beams toward users' wireless devices (e.g., smartphones, etc.) on an as-needed basis.

SUMMARY

In a first aspect of the invention, there is a phase shifter element including: a signal line including a signal line through-substrate-via (TSV) in a substrate; a ground return line including a ground return line TSV in the substrate; a capacitance control line including a capacitance control line TSV in the substrate; and an inductance control line including an inductance control line TSV in the substrate, wherein the phase shifter element has one of a first phase shift and a second phase shift, different from the first phase shift, based on a capacitance and an inductance of the signal line TSV.

In another aspect of the invention, there is a phased array including: plural phase shifters respectively connected to plural antenna elements, wherein: each of the plural phase shifters comprises plural phase shifter elements; and each respective one of the plural phase shifter elements comprises a signal line through-substrate-via (TSV) whose phase shift is configurable using an inductance switch and a capacitance switch in the respective phase shifter element.

In another aspect of the invention, there is a method including: determining a desired direction of a phased array antenna; and controlling switches in plural phase shifter elements in plural phase shifters of the phased array antenna to set respective phase shifts in the plural phase shifters to achieve the desired direction of the phased array antenna, wherein each respective one of the plural phase shifter elements comprises a signal line through-substrate-via (TSV) whose phase shift is configurable using an inductance switch and a capacitance switch in the respective phase shifter element.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
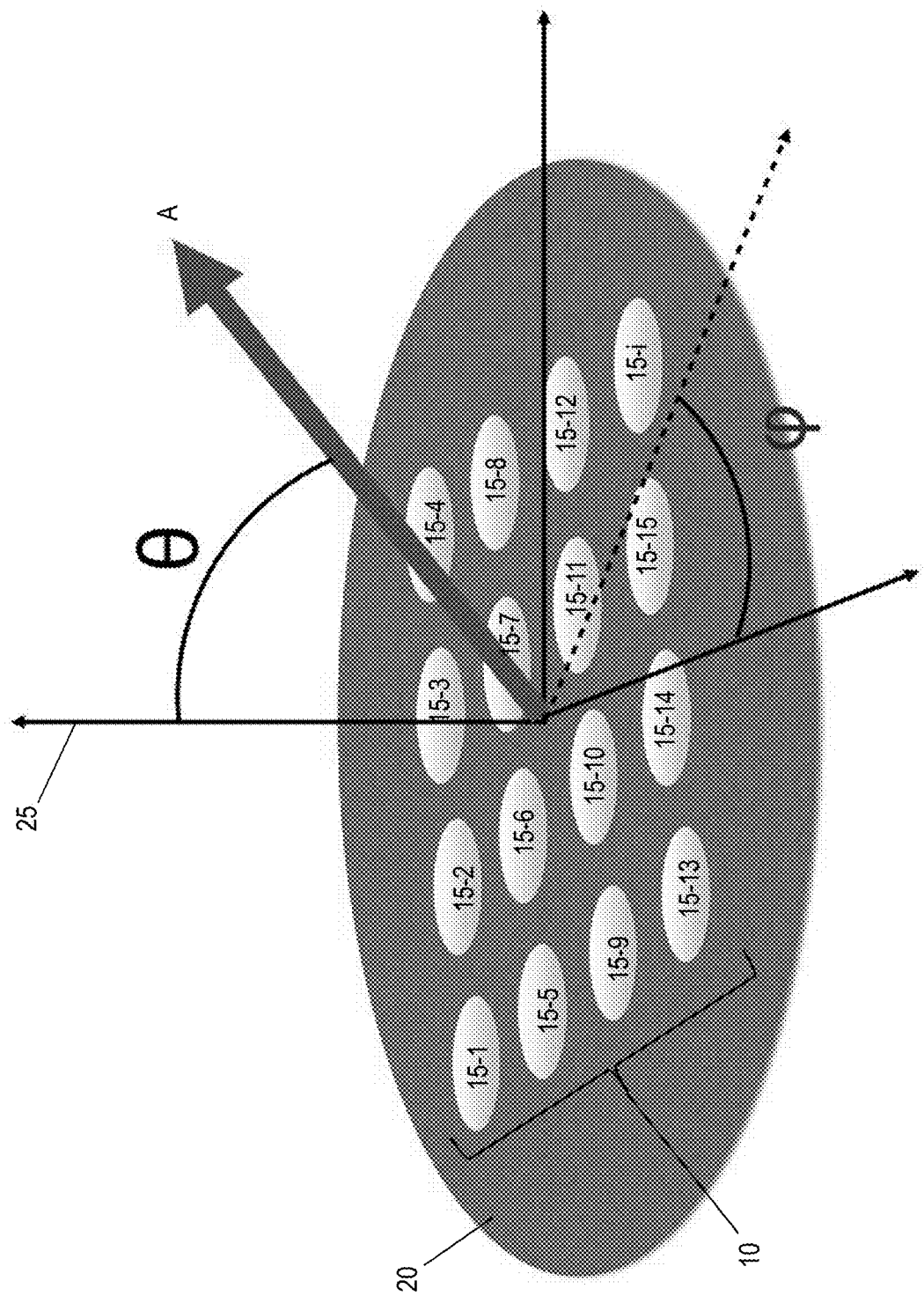
FIG. 1 shows an exemplary phased array antenna system in accordance with aspects of the invention.

The present invention relates generally to wireless communication systems and, more particularly, to a system that utilizes through-substrate-vias (TSVs) in phase shifter elements of a phased array antenna to achieve a desired direction of a beam formed by the phased array antenna. Utilizing TSVs as functional phase shifters and tunable matching circuits offers several advantages. First, from a practical standpoint, TSVs are often much larger than on-chip interconnects and therefore have lower metallic RF loss compared to on chip conduction paths (of course this is material dependent; but generally the cross-sectional area and cross-sectional perimeter of TSVs is much larger than the on-chip equivalent). Recognizing that the large cross-sectional area of TSVs provides lower loss per unit length, implementations of the invention utilize TSVs to provide lower loss phase shifters and impedance tuning networks. Second, circuits implemented using TSVs offer the potential of on-chip area reduction as the functional circuit components are now vertical instead of horizontal. For example, a TSV can typically be around 200 μm in length for a 200 mm wafer diameter process but can be shorter and longer in other processes. In the example of a 200 μm TSV, a system achieves 200 μm worth of phase shift in a relatively small area on chip. Third, the TSV configurations possible to control inductance and capacitance are not possible with conventional on-chip interconnect and allow different fundamental design choices that allow greater/more-effective inductance and capacitance tuning than is possible in on-chip designs. These advantages lead to overall system performance improvements. These devices may be able to achieve 60 degrees/dB phase change per dB of loss and have inductance tuning high-low ratios in excess of 3.

Implementations of the invention include phase shifters that use TSVs as the functional control elements of both phase and characteristic impedance (Zo). TSV phase shifters made in accordance with aspects of the invention provide several advantages: reduced area makes it compatible with 6G/high-MMW frequencies such as 77 GHz and above; allows greater phase tuning range than normally possible per unit substrate area, which results in lower loss per degree phase change; lower RF loss assuming using low resistivity substrates and typical TSV cross sections; offers great design flexibility connecting to antenna array, particularly for 6G antenna elements whose antenna arrays are chip scale; and is compatible with construction of multi-band phased array using common chip and antenna array.

As described herein, implementations of the invention provide: a phase shifter whose with functional actively controlled phase-shift elements are formed with TSVs; a phase shifter whose characteristic impedance is controlled actively controlled using elements formed from TSVs; an antenna array assembly whose actively controlled phase shift elements are formed using TSVs; an antenna controlled matching network whose impedance matching circuits are controlled using TSV elements; and a multiband phased array assembly whose functional control elements are formed of TSVs.

FIG. 1 shows an exemplary phased array antenna system that may be used with aspects of the invention. In the example shown in FIG. 1, the phased array antenna system 10 comprises a 4×4 array of antenna elements 15-1, 15-2, . . . , 15-i included in a coin-shaped sensor 20. In this example "i" equals sixteen; however, the number of antenna elements shown in FIG. 1 is not intended to be limiting, and the phased array antenna system 10 may have a different number of antenna elements. Similarly, the implementation in the coin-shaped sensor 20 is only for illustrative purposes, and the phased array antenna system 10 may be implemented in different structures.

Still referring to FIG. 1, the arrow "A" represents a direction of the beam that is formed by the phased array antenna system 10 using constructive and destructive superposition of signals from the antenna elements 15-1, 15-2, . . . , 15-i using beam steering principles. Angle θ represents the polar angle and angle φ represents the azimuth angle of the direction of the arrow A relative to a frame of reference 25 defined with respect to the phased array antenna system 10.

Figure 2:
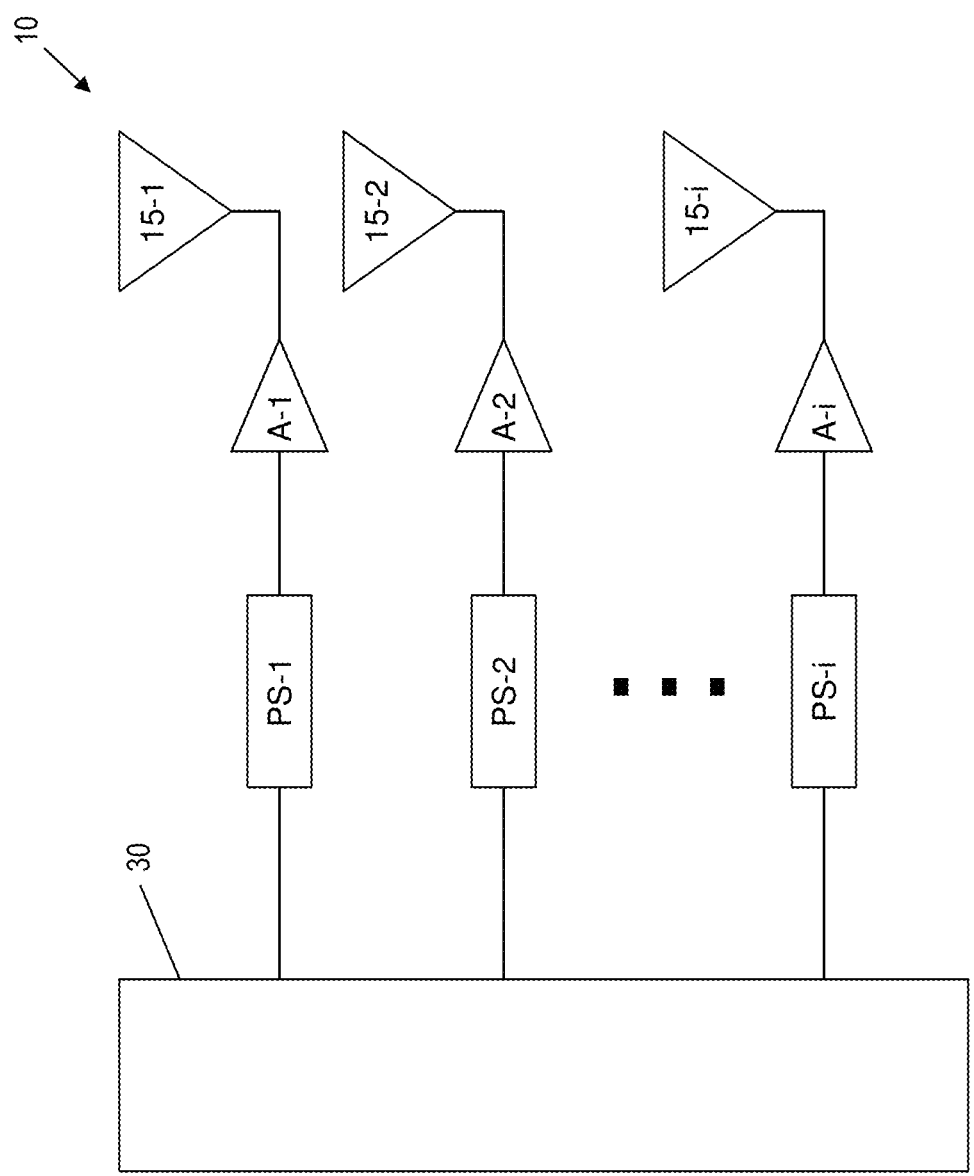
FIG. 2 shows a block diagram of an arrangement of components within the phased array antenna system in accordance with aspects of the invention.

FIG. 2 shows a block diagram of an arrangement of components within the phased array antenna system 10 in accordance with aspects of the invention. In embodiments, a respective phase shifter PS-1, PS-2, . . . , PS-i and amplifier A-1, A-2, . . . , A-i are connected to each respective one of the antenna elements 15-1, 15-2, . . . , 15-i. In particular embodiments, the respective phase shifter PS-1, PS-2, . . . , PS-i and amplifier A-1, A-2, . . . , A-i are connected in series upstream of the respective one of the antenna elements 15-1, 15-2, . . . , 15-i as shown in FIG. 2. In implementations, a respective transmission signal is provided to each of the phase shifters PS-1, PS-2, . . . , PS-i, e.g., from a power splitter 30 such as one or more Wilkinson power dividers. In accordance with aspects of the invention, a respective phase shifter (e.g., PS-i) shifts the phase by a predefined amount, the amplifier (A-i) amplifies the phase shifted signal, and the antenna element (15-i) transmits the amplified and phase shifted signal.

Figure 3:
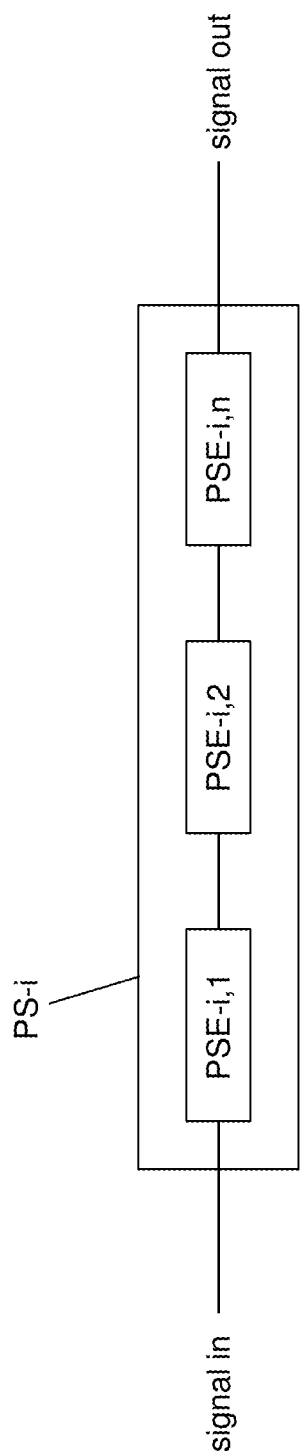
FIG. 3 shows a block diagram of an arrangement of phase shifter elements within a respective one of the phase shifters in accordance with aspects of the invention.

FIG. 3 shows a block diagram of an arrangement of phase shifter elements PSE-i,1, PSE-i,2, . . . , PSE-i,n within a respective one of the phase shifters PS-i in accordance with aspects of the invention. In embodiments, the phase shifter elements PSE-i,1, PSE-i,2, . . . , PSE-i,n are electrically connected in series in the phase shifter PS-i as depicted in FIG. 3. The number "n" of phase shifter elements may be any desired number. In a particular embodiment n=14; however, other numbers of phase shifter elements may be used in implementations of the invention. According to aspects of the invention, each one of the phase shifter elements PSE-i,1, PSE-i,2, . . . , PSE-i,n comprises a respective structure as described with respect to FIG. 4.

Figure 4:
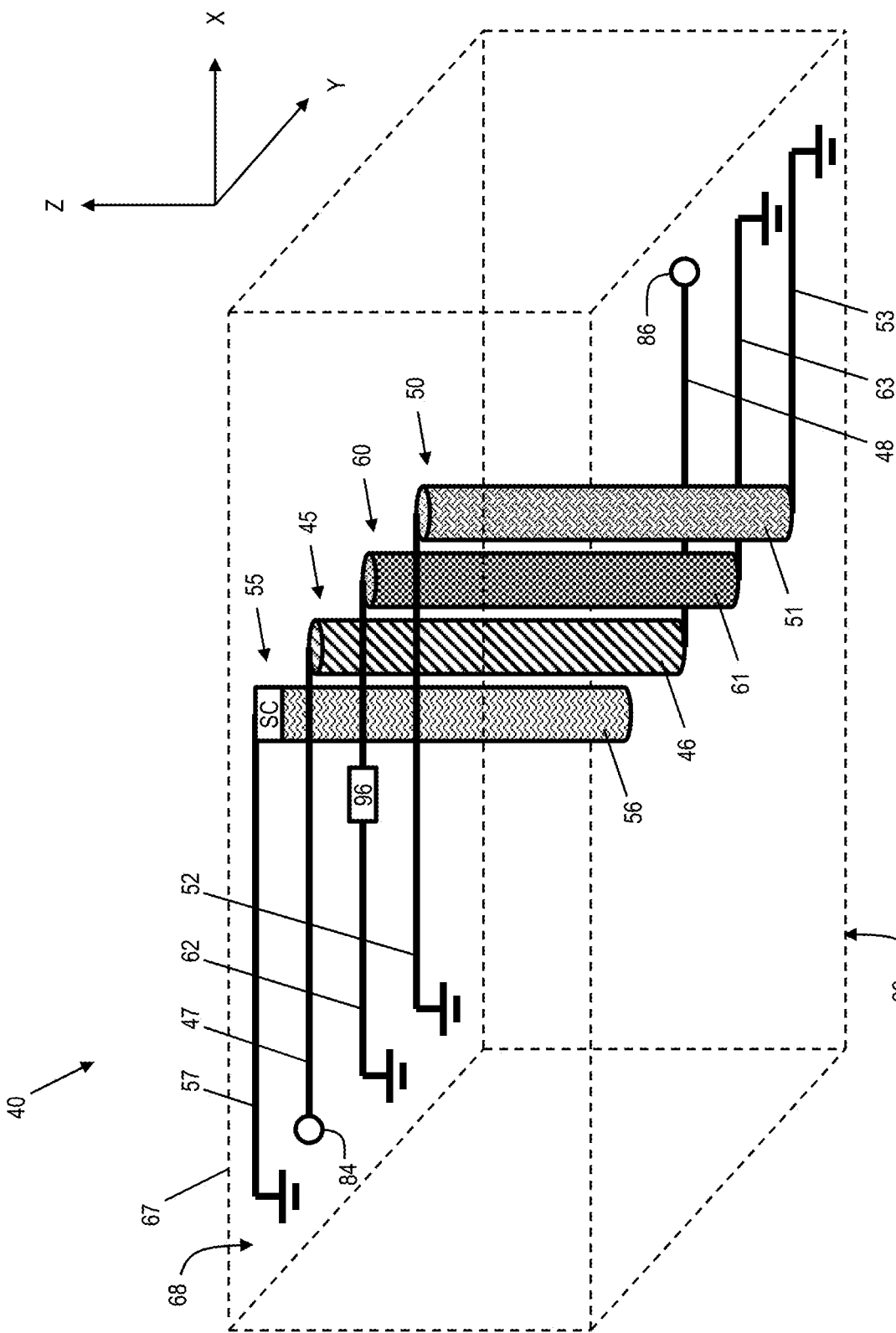
FIG. 4 shows a diagram of a representative one of the phase shifter elements in accordance with aspects of the invention.

FIG. 4 shows a diagram of an exemplary structure of a phase shifter element 40 of a representative one of the phase shifter elements PSE-i,n in accordance with aspects of the invention. In embodiments, the phase shifter element 40 comprises a signal line 45, at least one ground return line 50, a capacitance control line 55, and an inductance control line 60. In embodiments, the signal line 45 is configured to conduct an RF signal such as that used in 5G and 6G wireless communication systems. The ground return line 50 can be representative of a non-switchable conductor connected to ground. The capacitance control line 55 can be representative of a switchable conductor connected to ground. The inductance control line 60 can be representative of a switchable conductor that is connected between ground lines and provides a conditional ground return path.

In accordance with aspects of the invention, the signal line 45 includes at least one signal line TSV 46 that extends through a substrate 67 from a first side 68 to a second side 69 of the substrate 67. In embodiments, the signal line 45 includes a first signal line portion 47 connected to a first side of the signal line TSV 46, and a second signal line portion 48 connected to a second side of the signal line TSV 46 that is opposite the first side of the signal line TSV 46. The components of the signal line 45, including the signal line TSV 46, the first signal line portion 47, and the second signal line portion 48, are composed of metal or other electrical conductor material. As shown in FIG. 4, node 84 represents a "signal in" node and node 86 represents a "signal out" node for the phase shifter element 40.

In accordance with aspects of the invention, the at least one ground return line 50 includes at least one ground return line TSV 51 that extends through the substrate 67 from the first side 68 to the second side 69 of the substrate 67. In embodiments, the ground return line 50 includes a first ground return line portion 52 connected to a first side of the ground return line TSV 51, and a second ground return line portion 53 connected to a second side of the ground return line TSV 51 that is opposite the first side of the ground return line TSV 51. The components of the ground return line 50, including the ground return line TSV 51, the first ground return line portion 52, and the second ground return line portion 53, are composed of metal or other electrical conductor material.

In accordance with aspects of the invention, the capacitance control line 55 includes at least one capacitance control line TSV 56 that extends through the substrate 67 from the first side 68 to the second side 69 of the substrate 67. In embodiments, the capacitance control line 55 includes a first capacitance control line portion 57 connected to a first side of the capacitance control line TSV 56. In embodiments, a second side of the capacitance control line TSV 56, opposite the first side of the capacitance control line TSV 56, is not connected to any conductive material. The components of the capacitance control line 55, including the capacitance control line TSV 56 and the first capacitance control line portion 57 are composed of metal or other electrical conductor material.

Figure 5:
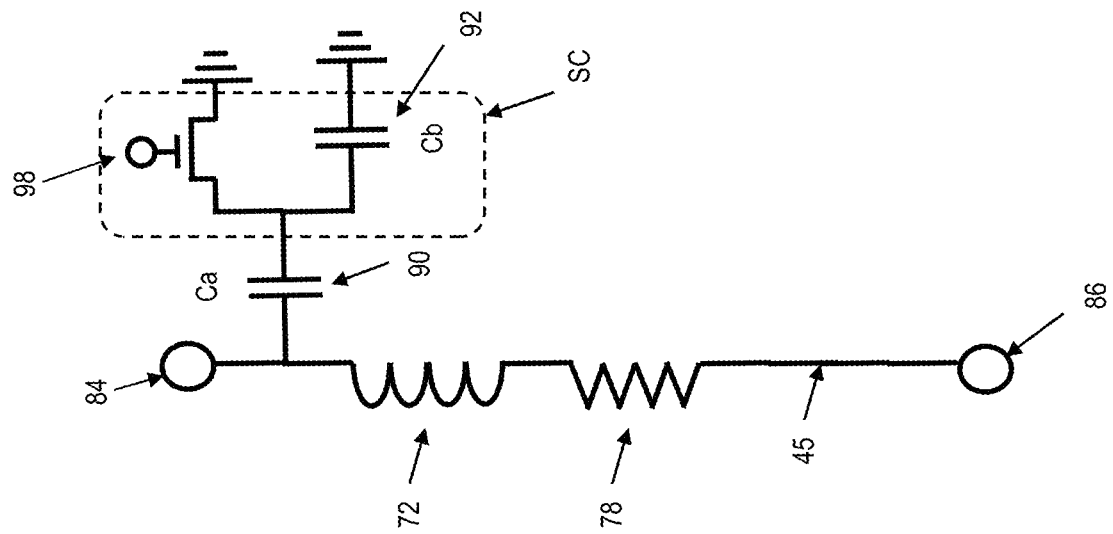
FIG. 5 shows a schematic diagram of the phase shifter element in accordance with aspects of the invention.
Figure 5:
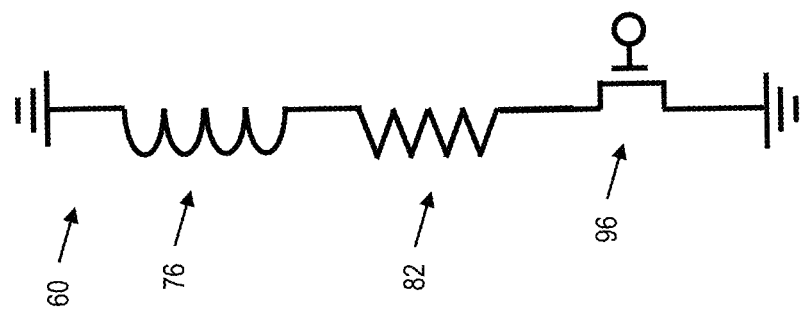
Figure 5:
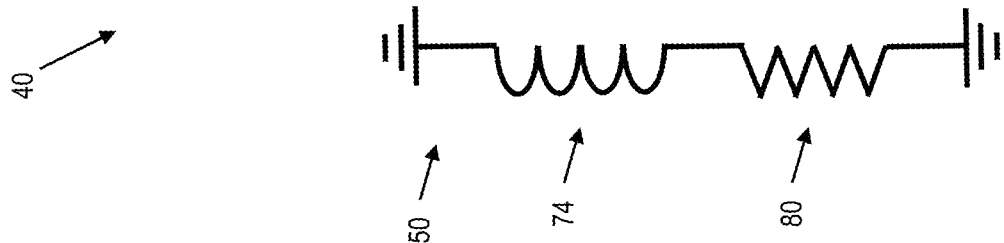

In embodiments, the capacitance control line 55 includes a switch circuit SC that includes at least one switch and at least one capacitor. An example of the switch circuit SC is shown in FIG. 5. In accordance with aspects of the invention, the switch circuit SC is used to control a capacitance state of the signal line TSV 46 in the manner described with respect to FIG. 5.

In accordance with aspects of the invention, the inductance control line 60 includes at least one inductance control line TSV 61 that extends through the substrate 67 from the first side 68 to the second side 69 of the substrate 67. In embodiments, the inductance control line 60 includes a first inductance control line portion 62 connected to a first side of the inductance control line TSV 61, and a second inductance control line portion 63 connected to a second side of the inductance control line TSV 61 that is opposite the first side of the inductance control line TSV 61. The components of the inductance control line 60, including the inductance control line TSV 61, the first inductance control line portion 62, and the second inductance control line portion 63, are composed of metal or other electrical conductor material.

In embodiments, the inductance control line 60 includes a switch 96, which may be a FET (field effect transistor), for example. In accordance with aspects of the invention, the switch 96 is used to control an inductance state of the signal line TSV 46 in the manner described with respect to FIG. 5.

In embodiments, the first signal line portion 47, the first ground return line portion 52, the first capacitance control line portion 56, and the first inductance control line portion 61 are all located in one or more layers (e.g., back end of line (BEOL) layers) on the first side 68 of the substrate 67. In embodiments, the second signal line portion 48, the second ground return line portion 53, and the second inductance control line portion 62 are all located in one or more layers (e.g., BEOL layers) on the second side 69 of the substrate 67.

The substrate 67 may be composed of any suitable material or combination of materials, such as diamond, doped or undoped silicon, glass, sapphire, ceramic, etc. In embodiments, the substrate 67 has a thickness in a range of 100 μm to 400 μm between the first side 68 and the second side 69 in the z direction shown in FIG. 4.

In embodiments, a cross sectional area of individual ones of the TSVs 46, 51, 56, 61 is much larger than a cross sectional area of transmission lines that are conventionally used in phase shifters. For example, transmission lines that are conventionally used in phase shifters typically have a thickness of 1.2 μm and a width of 6 μm, for a cross sectional area of 7.2 μm² measured in a plane perpendicular to the primary direction of current flow. However, in embodiments described herein, the TSVs have a length of 5 μm in the x direction and a width of 20 μm in the y direction, for a cross sectional area of 100 μm² (also measured in a plane perpendicular to the primary direction of current flow), which is more than ten times greater than the cross sectional area of conventional transmission lines. This larger cross section per unit length for the TSVs means that the TSVs has less loss per unit length than do the conventional transmission lines. As a result, a phase shifter that includes one or more TSVs in the signal line has less loss than a phase shifter than uses only smaller transmission lines. Although rectangular TSV are described herein for purposes of illustrating aspects of the invention, embodiments are not limited to any particular shape of TSV. Instead, any desired shape TSV may be utilized.

FIG. 5 shows a schematic diagram of the phase shifter element 40 of FIG. 4 in accordance with aspects of the invention. An inductance 72 represents the self-inductance of the signal line 45, an inductance 74 represents the self-inductance of the ground return line 50, and an inductance 76 represents the self-inductance of the inductance control line 60. Coupling inductances exist between these lines as well, with a mutual inductance between the signal line 45 and the inductance control line 60, a mutual inductance between the signal line 45 and the ground lines 50, and a mutual inductance between the ground lines 50 and the inductance control line 60.

Still referring to FIG. 5, resistance 78 represents the resistance of the signal line 45, resistance 80 represents the resistance of the ground return line 50, and resistance 82 represents the resistance of the inductance control line 60, as defined by their materials and geometries. Capacitance 90 (with a value of Ca) represents a capacitance between the signal line TSV 46 and the capacitance control line TSV 56, and capacitance 92 (with a value of Cb) represents a capacitance between the capacitance control line TSV 56 and the ground return line TSV 51 plus any other ground metal in the phase shifter element 40.

In embodiments, the inductance and the capacitance of the phase shifter element 40 are controlled through separate networks and are controlled independently. In operation, the open or closed state of the inductance switch 96 affects the signal inductance (L) in the signal line TSV 46, and the open or closed state of a capacitance switch 98 in the switch circuit SC affects the signal capacitance (C) in the signal line TSV 46.

For example, when the inductance switch 96 is in an ON state (i.e., closed), return current flows in the inductance control line TSV 61 and signal inductance (L) is in a low state ($L_{low}$). On the other hand, when the inductance switch 96 is in an OFF state (i.e., open), return current does not flow in the inductance control line TSV 61 such that signal inductance (L) is in a high state ($L_{high}$).

Similarly, when the capacitance switch 98 is in an ON state (i.e., closed), the signal capacitance (C) is equal to that of capacitance 90 (e.g., Ca), which is a high capacitance state ($C_{high}$). On the other hand, when the capacitance switch 98 is in an OFF state (i.e., open), then the signal capacitance (C) equals $(Ca*C_{eff})/(Ca+C_{eff})$, which equals Ca/2 when $Ca=C_{eff}$ and which is a low capacitance state ($C_{low}$), where $C_{eff}$ equals $Cb+C_{FET}$ where $C_{FET}$ equals the capacitance of the switch in the OFF state. This is summarized in Table 1.

TABLE 1

| | switch = closed | switch = open |
|---|---|---|
| inductance switch 96 | $L_{low}$ | $L_{high}$ |
| capacitance switch 98 | $C_{high}$ | $C_{low}$ |

The phase shift (also referred to as the delay) of the signal travelling from node 84 to node 86 is affected by the signal inductance (L) and the signal capacitance (C) according to the relation: delay∝SQRT(L*C). Therefore, the phase shift of the signal travelling from node 84 to node 86 can be changed by opening or closing the inductance switch 96, which changes the value of the signal inductance (L), and/or opening or closing the capacitance switch 98, which changes the value of the signal capacitance (C).

In a particular embodiment, in order to maintain a substantially constant characteristic impedance of the signal line 45, the elements of the phase shifter element 40 are sized and shaped such that $(L_{high}/L_{low})=(C_{high}/C_{low})$. The characteristic impedance of the signal line 45 is defined as Zo=SQRT $(L_{low}/C_{low})$=SQRT$(L_{high}/C_{high})$. In this embodiment, to maintain a substantially constant characteristic impedance for different amounts of delay, the phase shifter element 40 of the phase shifter element PSE-i,n is programmed in only one of two configurations: (i) the inductance switch 96 is ON and the capacitance switch 98 is OFF to provide a fast state, e.g., a smaller delay given by delay=SQRT$(L_{low}*C_{low})$; and (ii) the inductance switch 96 is OFF and the capacitance switch 98 is ON to provide a slow state, e.g., a larger delay given by delay=SQRT$(L_{high}*C_{high})$. In this manner, the phase shifter element 40 has one of a first phase shift and a second phase shift, different from the first phase shift, based on a capacitance and an inductance of the signal line TSV 46. This is summarized in Table 2.

TABLE 2

|  | Fast state of PSE-i,n | Slow state of PSE-i,n |
| --- | --- | --- |
| inductance switch 96 | ON (closed) | OFF (open) |
| capacitance switch 98 | OFF (open) | ON (closed) |
| delay (phase shift) | SQRT$(L_{low}*C_{low})$ | SQRT$(L_{high}*C_{high})$ |
| characteristic impedance | SQRT$(L_{low}/C_{low})$ | SQRT $(L_{high}/C_{high})$ |

In accordance with aspects of the invention, the phase shifter element 40 may be used as a TSV impedance matching circuit. In one example, the "signal out" terminal (i.e., node 86) is eventually terminated to ground, and the RF impedance seen from the "signal in" terminal (i.e. node 84) can be dynamically tuned for optimal RF performance. The device would be suited for dynamic impedance correcting/matching for RF/MMW amplifiers and phased array antenna elements. In this example, the "signal out" terminal (i.e., node 86) may be eventually terminated to ground after passing through plural phase shifter elements 40 connected in series, e.g., in a serpentine fashion as shown in FIG. 6.

With continued reference to FIG. 5, node 84 represents the "signal in" node and node 86 represents the "signal out" node for the phase shifter element 40 for this phase shifter element PSE-i,n. When the phase shifter elements PSE-i,1, PSE-i,2, PSE-i,n are electrically connected in series in the phase shifter PS-i as depicted in FIG. 3, the node 86 of phase shifter element PSE-i,1 is connected to node 84 of phase shifter element PSE-i,2 and so on. Moreover, the input node 84 of phase shifter element PSE-i,1 is connected to (and receives the signal from) the power splitter 30 as shown in FIG. 2. Additionally, the output node 86 of the phase shifter element PSE-i,n is connected to (and provides the phase shifted signal to) the amplifier A-i as shown in FIG. 2. In this manner, the phase shift of the signal passing through any one phase shifter PS-i is the cumulative result of all the phase shifts applied by the respective phase shifter elements PSE-i,1, PSE-i,2, ..., PSE-i,n within that phase shifter PS-i.

In a particular embodiment, a memory included in the phased array antenna system 10 (of FIG. 1) stores data that defines which switches 96, 98 to open and close for plural different combinations of values of angle θ (i.e., the polar angle of the direction of the arrow A) and angle φ (i.e., the azimuth angle of the direction of the arrow A). In this embodiment, for a desired combination of values of angles θ and φ, a control circuit in the system uses the stored data to determine which switches 96, 98 to open and close (for each of the phase shifter elements PSE-i,1, PSE-i,2, ..., PSE-i,n included in each of the phase shifters PS-1, PS-2, ..., PS-i) to achieved the desired combination of values of angles θ and cp. In this manner, once the desired direction of the phased array antenna system 10 is determined (e.g., as defined by particular a combination of values of angles θ and φ), the system controls the switches 96, 98 in the phase shifter elements PSE-i,1, PSE-i,2, ..., PSE-i,n included in each of the phase shifters PS-1, PS-2, ..., PS-i to achieve this desired direction. Subsequently, the system may determine a different direction A with a different combination of values of angles θ and φ, and the system may then control the switches 96, 98 in the phase shifter elements PSE-i,1, PSE-i,2, ..., PSE-i,n included in each of the phase shifters PS-1, PS-2, ..., PS-i to achieve this different direction. In embodiments, the phased array antenna system 10 is configured for automatically determining the direction A as defined by particular a combination of values of angles θ and φ. Such automatic determination of a direction of a phased array antenna system is sometimes referred to as "self-installation" and/or "tracking" and is described, for example, in United States Patent Application Publication No. 2019/0089434, published Mar. 21, 2019, the contents of which are expressly incorporated by reference herein in their entirety. Based on such automatic determination of the direction A, the system may control the switches 96, 98 in the phase shifter elements PSE-i,1, PSE-i,2, ..., PSE-i,n included in each of the phase shifters PS-1, PS-2, ..., PS-i to achieve this desired direction, in the manner described herein.

Figure 6:
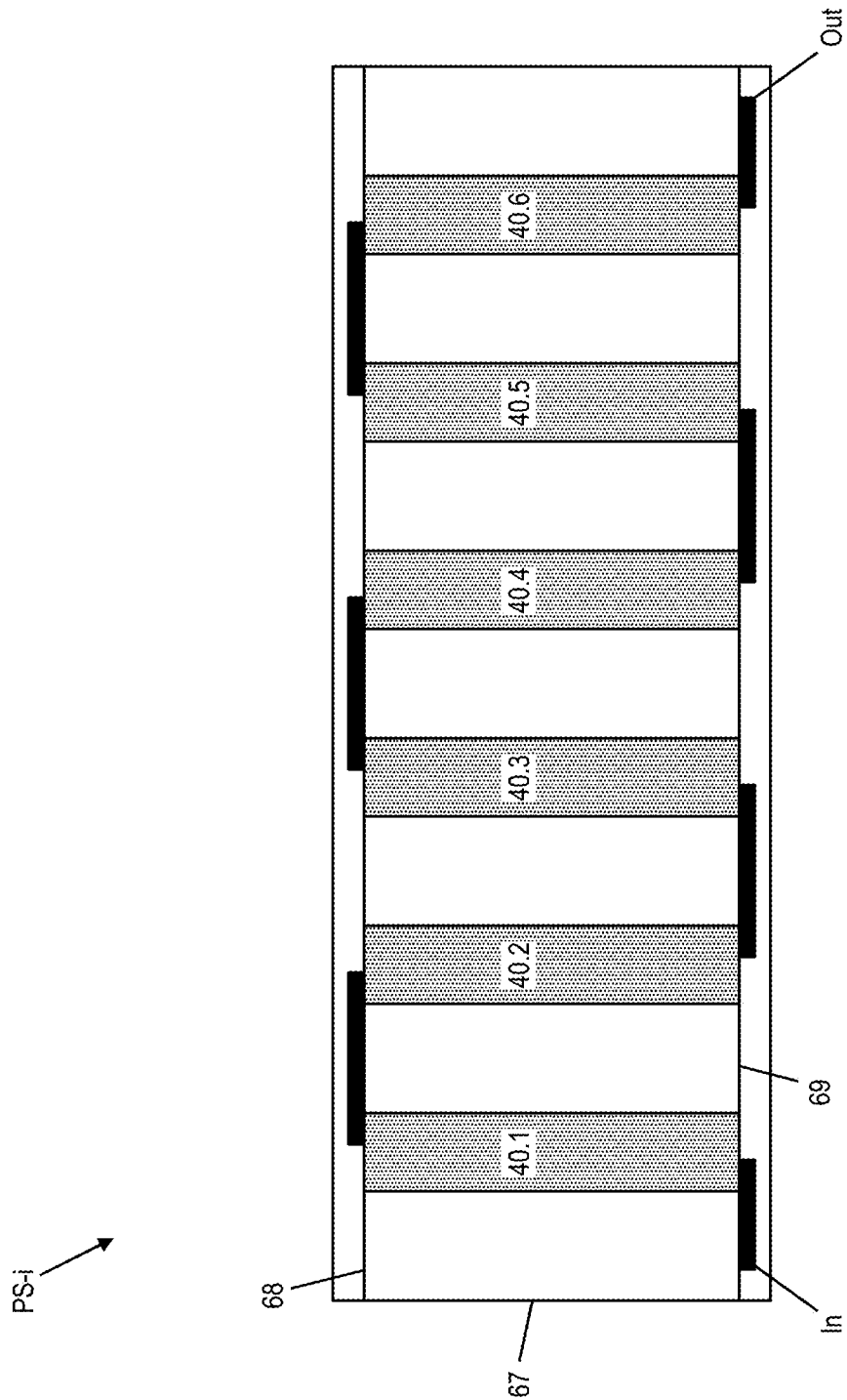
FIG. 6 shows a phase shifter comprising plural phase shifter elements in accordance with aspects of the invention.

FIG. 6 shows a phase shifter comprising plural phase shifter elements in accordance with aspects of the invention. In particular, FIG. 6 shows a chain of six phase shifter elements 40.1, 40.2, 40.3, 40.4, 40.5, 40.6 connected in series to form a phase shifter PS-i as shown in FIG. 3, for example. Each of the six phase shifter elements 40.1-40.6 may comprise an instance of the phase shifter element 40 shown in FIG. 4, with the signal in node of one of the phase shifter elements connected to the signal out node of the next one of the phase shifter elements, e.g., as described herein. The signal in node of the first phase shifter element 40.1 is an "in" terminal of the phase shifter PS-i, and the signal out node of the last phase shifter element 40.6 is an "out" terminal of the phase shifter PS-i. In embodiments, when the "out" terminal is grounded, the "in" terminal is a tunable load connection.

As shown in FIG. 6, in embodiments the phase shifter elements 40.1-40.6 are formed in a substrate 67 having a first side 68 and a second side 69. In embodiments, the wiring connections between respective ones of the phase shifter elements 40.1-40.6 are formed in one or more layers (e.g., BEOL wiring layers) formed on the first side 68 and a second side 69 of the substrate 67.

The number of phase shifter elements shown in FIG. 6 is exemplary and not limiting. Phase shifters PS-i may be made in accordance with aspects of the invention with other numbers of phase shifter elements.

Figure 7:
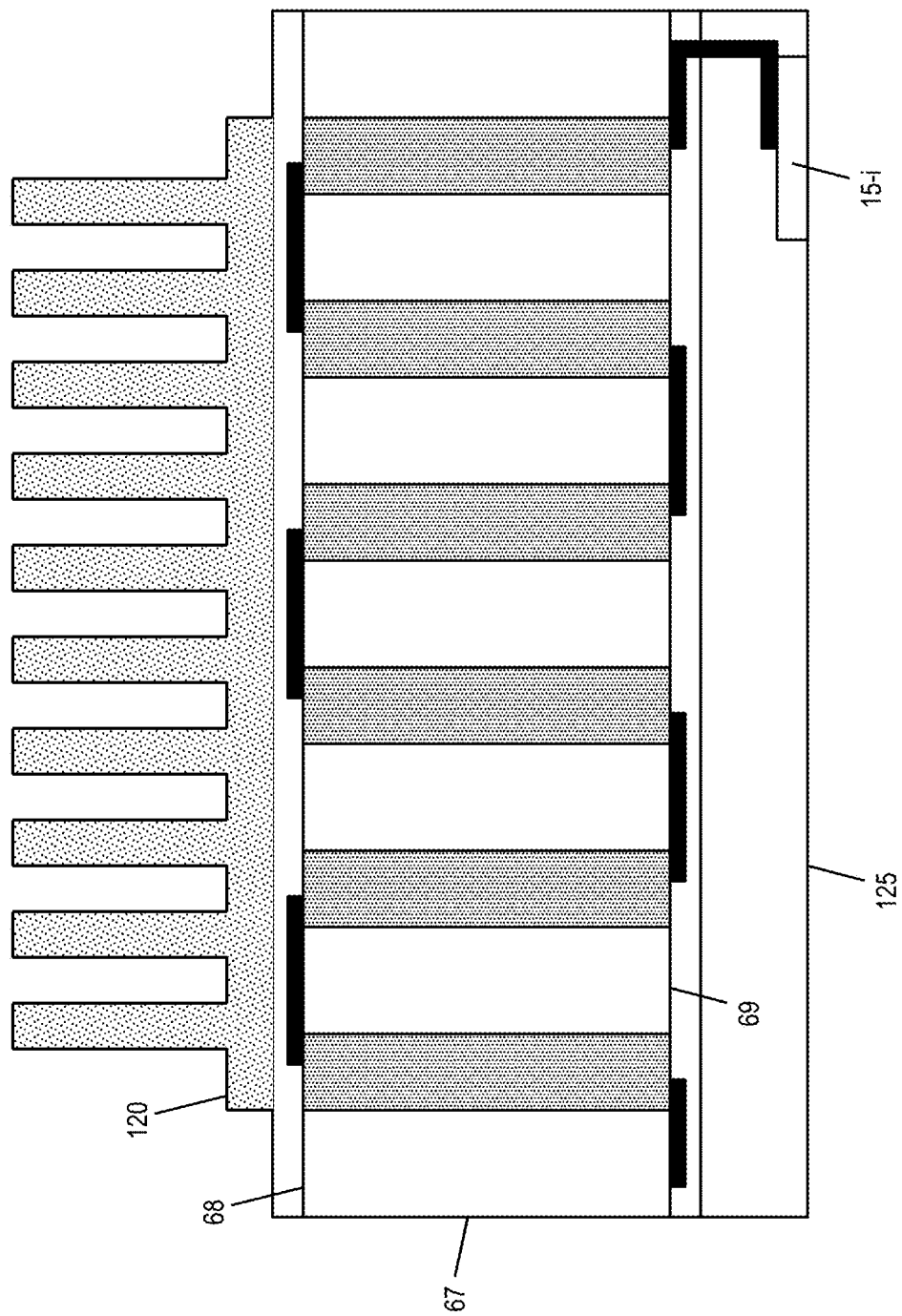
FIG. 7 shows a system in accordance with aspects of the invention.

FIG. 7 shows a system in accordance with aspects of the invention. In embodiments, the system includes the phase shifter shown in FIG. 6 including plural phase shifter elements connected in series, with each of the phase shifter elements comprising TSVs in the substrate 67. In embodiments, a heat sink 120 is arranged at the first side 68 of the substrate 67, and an antenna substrate 125 is arranged at the second side 69 of the substrate 67. For example, the heat sink 120 may be connected to the outermost layer on the first side 68 of the substrate 67, and the antenna substrate 125 may be connected to the outermost layer on the second side 69 of the substrate 67.

In embodiments, the antenna substrate 125 includes the antenna elements 15-1 through 15-i shown in FIGS. 1 and 2. Although not shown, the substrate 67 may include plural individual phase shifters PS-1 through PS-i, the number of phase shifters matching the number of antenna elements in the antenna substrate 125, with respective ones of the phase shifters being operatively connected (e.g., by wiring, transmission lines, etc.) to respective ones of the antenna elements, e.g., as depicted in FIG. 2.

In embodiments, the system of FIG. 7 is constructed such that a majority of the active circuitry of the phased array antenna system (e.g., amplifiers) is at the second side 68 of the substrate 67. In this manner, a majority of the primary heat-generating elements are closer to the heat sink 120, which can more effectively dissipate the heat generated by such elements.

It is envisioned that 6G phased array antennas will look similar to that shown in FIG. 7 and that TSVs will be present in the array to take signals from one side of the chip to the other side where the antenna array is. This configuration allows the hotter IC circuitry to be placed closer to the heat sink as depicted in FIG. 7. Implementations of the invention utilize the TSVs to provide phase shifting functionality. Having functional elements (such as phase shifters) within the TSV paths is advantageous because it reduces the size of the system and gives RF/MMW designers design flexibility on where to locate elements in the system.

Figure 8:
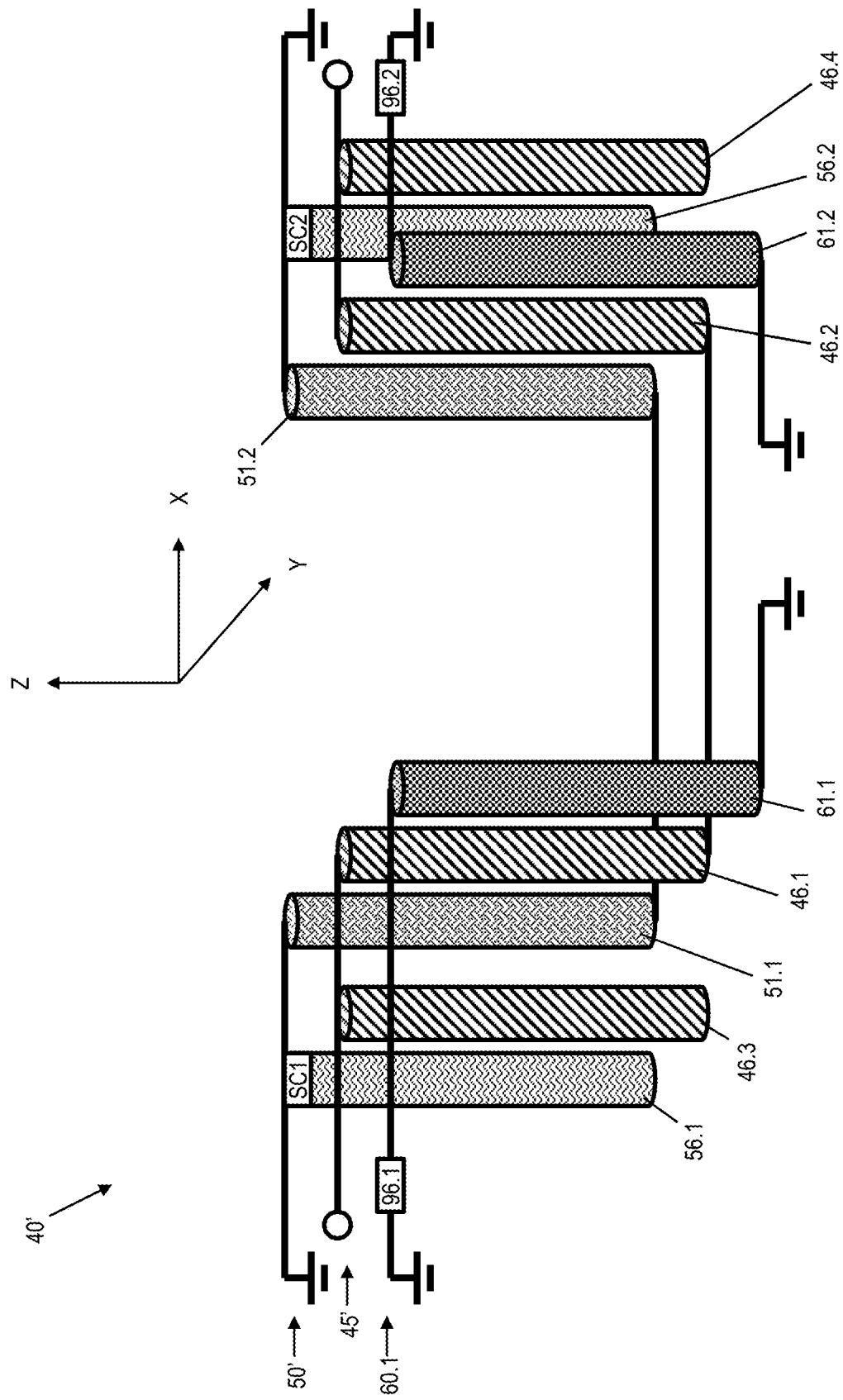
FIG. 8 shows an embodiment of a phase shifter element in accordance with aspects of the invention.

FIG. 8 shows an embodiment of a phase shifter element in accordance with aspects of the invention. In this embodiment, the phase shifter element 40' comprises: a signal line 45', a ground return line 50', two inductance control lines 60' and 60". In this example, the signal line 45' comprises signal line TSVs 46.1, 46.2, 46.3, 46.4 formed in the substrate (e.g., substrate 67 as in FIG. 4) and connected with conductive line portions as shown in FIG. 8. In this example, the ground return line 50' comprises ground return line TSVs 51.1, 51.2 formed in the substrate (e.g., substrate 67 as in FIG. 4) and connected with conductive line portions as shown in FIG. 8. In this example, a first capacitance TSV 56.1 is connected to the ground return line 50' by a first switch circuit SC1, and a second capacitance TSV 56.2 is connected to the ground return line 50' by a second switch circuit SC2. The switch circuits SC1 and SC2 may be similar to switch circuit SC of FIGS. 4 and 5. In embodiments, the capacitance is controlled using the TSV pairs 56.1/46.3 and 56.2/46.4.

Still referring to the example shown in FIG. 8, the first inductance control line 60' includes a first inductance TSV 61.1 and a switch 96.1 (which may be similar to switch 96 of FIG. 4), and the second inductance control line 60" includes a second inductance TSV 61.2 and a switch 96.2 (which may be similar to switch 96 of FIG. 4). The switches 96.1, 96.2 (like the switch 96 of FIG. 4) may be FETs and can be made from multiple materials such as Si, GaAs, SiN, GaN, etc.) The switches 96.1, 96.2 (like the switch 96 of FIG. 4) may be fabricated in the substrate 67 with the TSVs or may be fabricated in another electrically connected substrate such as a multi-tiered substrate package stack.

In operation, the inductance of the exemplary phase shifter element shown in FIG. 8 is controlled by the switches 96.1, 96.2. When the switches 96.1, 96.2 are closed, the inductance is decreased (e.g., $L_{low}$ as described above) due to ground return current flowing in the inductance control lines 60' and 60". When the switches 96.1, 96.2 are open, the inductance is increased (e.g., $L_{high}$ as described above). Likewise, the switch circuits SC1, SC2 can be controlled to achieve a low capacitance state (e.g., $C_{low}$ as described above) or a high capacitance state (e.g., $C_{high}$ as described above). In this exemplary implementation, by controlling the switches 96.1, 96.2 to achieve one of four possible inductance states and the switch circuits SC1, SC2 to achieve one of four possible capacitance states, multiple delay and impedance states can be achieved with the phase shifter element shown in FIG. 8.

Figure 9:
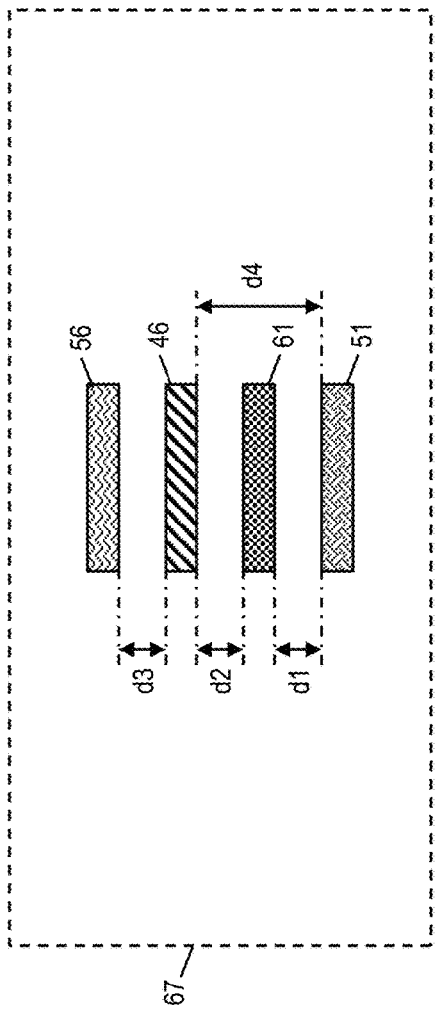
FIG. 9 shows a plan view of an embodiment of a phase shifter element in accordance with aspects of the invention.

FIG. 9 shows a plan view of an embodiment of a phase shifter element in accordance with aspects of the invention. In particular, FIG. 9 shows a plan, cross-sectional view of the phase shifter element 40 of FIG. 4, including the signal line TSV 46, the ground return line TSV 51, the capacitance control line TSV 56, and the inductance control line TSV 61.

In the example shown in FIG. 9, the capacitance control line TSV 56 is located on one side of the signal line TSV 46 in the y direction, and the ground return line TSV 51 and the inductance control line TSV 61 are located on the opposite side of the signal line TSV 46 in the y direction. There is a distance d1 between the ground return line TSV 51 and the inductance control line TSV 61, a distance d2 between the inductance control line TSV 61 and the signal line TSV 46, and a distance d3 between the signal line TSV 46 and the capacitance control line TSV 56. In one exemplary implementation, each of the TSVs 46, 51, 56, 61 has a length of 20 μm in the x direction and a width of 5 μm in the y direction, and the distances are: d1=40 μm, d2=60 μm, d3=20 μm. These dimensions are exemplary and not intended to be limiting, and other dimensions may be used. In embodiments, a distance between the ground return line TSV 51 and the signal line TSV 46 (shown as d4 in FIG. 9) is greater than a distance between the inductance control line TSV 61 and the signal line TSV 46 (shown as d2 in FIG. 9). In embodiments, a distance between the ground return line TSV 51 and the signal line TSV 46 (shown as d4 in FIG. 9) is greater than a distance between the capacitance control line TSV 56 and the signal line TSV 46 (shown as d3 in FIG. 9).

Figure 10:
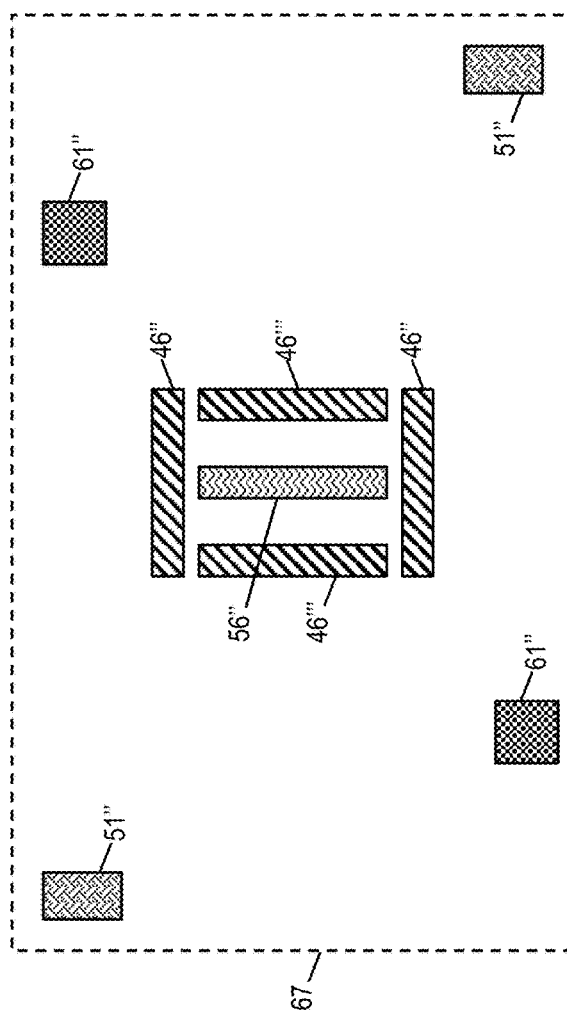
FIG. 10 shows a plan view of an embodiment of a phase shifter element in accordance with aspects of the invention.

FIG. 10 shows a plan view of an embodiment of a phase shifter element in accordance with aspects of the invention. In particular, FIG. 10 shows a plan, cross-sectional view of another configuration of a phase shifter element 40" including signal line TSVs 46" and 46'", ground return line TSVs 51", a capacitance control line TSV 56", and inductance control line TSVs 61" formed in the substrate 67. In the example shown in FIG. 10, the signal line TSVs 46' are inductance invisible TSVs, and the signal line TSVs 46'" are inductance visible TSVs.

As described herein, the cross-sectional area of TSVs (such as the TSVs of FIG. 10) can be larger than conductors on the chip which helps reduce loss. Also, the relative positions and orientations of the conductors is much more flexible than in a normal/conventional metal-dielectric stack on chips where the conductors only exist in a few allowed layers with common heights and thicknesses and whose surfaces are largely parallel to each other.

As shown in FIG. 10, the capacitance-control TSV 56" is effectively surrounded by multiple signal line TSVs 46" and 46' (e.g., the same signal in multiple paths) and therefore has little parasitic capacitance to ground which will decrease Cb (in the diagram of FIG. 5) and increase the capacitance tuning range. The dedicated ground return line TSVs 51" provide a controlled impedance path for the signal and also can connect top and bottom ground metal planes to reduce unintended RF modes. Inductance control line TSVs 61" provide the inductance tuning paths. Although two inductance control line TSVs 61" are shown, the phase shifter element 40" could be implemented with only one. Likewise, although two dedicated ground return line TSVs 51" are shown, the phase shifter element 40″ could be implemented with only one. Using two has the advantage of providing a bit of shielding for other nearest-neighbor TSV phase shifters.

In accordance with further aspects of the invention, there is a method of manufacturing a phase shifter element as described herein. In accordance with further aspects of the invention, there is a method of manufacturing a phased array antenna that includes one or more phase shifter elements as described herein. The structures of the present invention, including the phase shifter element PSE-i,n comprising a phase shifter element 40, can be manufactured in a number of ways using a number of different tools. In some embodiments that utilize semiconductor structures, the methodologies and tools are used to form structures with dimensions in the micrometer and nanometer scale. The methodologies, i.e., technologies, employed to manufacture the structures of the present invention have been adopted from integrated circuit (IC) technology. For example, the structures of the present invention are built on wafers and are realized in films of material patterned by photolithographic processes on the top of a wafer. In particular, the fabrication of the structures of the present invention uses three basic building blocks: (i) deposition of thin films of material on a substrate, (ii) applying a patterned mask on top of the films by photolithographic imaging, and (iii) etching the films selectively to the mask.

In some embodiments, the method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A phase shifter element, comprising:
a signal line including a signal line through-substrate-via (TSV) in a substrate;
a ground return line including a ground return line TSV in the substrate;
a capacitance control line including a capacitance control line TSV in the substrate; and
an inductance control line including an inductance control line TSV in the substrate,
wherein the phase shifter element has one of a first phase shift and a second phase shift, different from the first phase shift, based on a capacitance and an inductance of the signal line TSV.

2. The phase shifter element of claim 1, further comprising an inductance switch in the inductance control line that controls the inductance of the signal line TSV.

3. The phase shifter element of claim 2, wherein:
the inductance of the signal line TSV is in a low state when the inductance switch is in an ON state; and
the inductance of the signal line TSV is in a high state when the inductance switch is in an OFF state.

4. The phase shifter element of claim 1, further comprising a capacitance switch that controls the capacitance of the signal line TSV.

5. The phase shifter element of claim 4, wherein:
the capacitance of the signal line TSV is in a high state when the capacitance switch is in an ON state; and
the capacitance of the signal line TSV is in a low state when the capacitance switch is in an OFF state.

6. The phase shifter element of claim 1, wherein:
the first phase shift is achieved as a result of an inductance switch of the inductance control line being ON and a capacitance switch of the capacitance control line being OFF; and
the second phase shift is achieved as a result of the inductance switch of the inductance control line being OFF and the capacitance switch of the capacitance control line being ON.

7. The phase shifter element of claim 6, wherein the phase shifter element has a same characteristic impedance in both the first phase shift and the second phase shift.

8. The phase shifter element of claim 1, wherein the phase shifter element is one of plural phase shifter elements connected in series and connected to an antenna element.

9. The phase shifter element of claim 8, wherein the plural phase shifter elements connected with first wiring in one or more layers at a first side of the substrate and second wiring in one or more layers at a second side of the substrate.

10. A phased array antenna system comprising the phase shifter element of claim 8.

11. The phased array antenna system of claim 10, wherein the phased array antenna system comprises:
an antenna substrate containing the plural antenna elements; and
a heat sink.

12. The phased array antenna system of claim 11, wherein:
the antenna substrate is on a first side of the substrate; and
the heat sink is on a second side of the substrate opposite the first side of the substrate.

13. The phase shifter element of claim 1, wherein each of the signal line TSV, the ground return line TSV, the capacitance control line TSV, and the inductance control line TSV extends through the substrate from a first side of the substrate to a second side of the substrate.

14. The phase shifter element of claim 1, wherein the signal line comprises:
a first portion on a first side of the substrate and connected to a first end of the signal line TSV; and
a second portion on a second side of the substrate and connected to a second end of the signal line TSV.

15. A phased array, comprising:
plural phase shifters respectively connected to plural antenna elements, wherein:
each of the plural phase shifters comprises plural phase shifter elements; and each respective one of the plural phase shifter elements comprises a signal line through-substrate-via (TSV) whose phase shift is configurable using an inductance switch and a capacitance switch in the respective phase shifter element.

16. The phased array of claim 15, further comprising a control circuit that is configured to control each of the plural phase shifters to achieve a direction of a beam.

17. The phased array of claim 16, wherein the direction of the beam is defined by an azimuth angle and a polar angle.

18. The phased array of claim 15, wherein each respective one of the plural phase shifter elements comprises:
   a capacitance control line TSV; and
   an inductance control line TSV.

19. The phased array of claim 15, wherein impedance matching circuits are controlled using the signal line TSVs of the plural phase shifter elements in each of the plural phase shifters.

20. The phased array of claim 15, wherein the phased array comprises a multiband phased array assembly.

21. The phased array of claim 15, wherein the signal line TSV extends through a substrate from a first side of the substrate to a second side of the substrate.

22. The phased array of claim 21, further comprising:
   an antenna substrate containing the plural antenna elements, wherein the antenna substrate is on the first side of the substrate; and
   a heat sink on the second side of the substrate.

23. A method, comprising:
   determining a desired direction of a phased array antenna; and
   controlling switches in plural phase shifter elements in plural phase shifters of the phased array antenna to set respective phase shifts in the plural phase shifters to achieve the desired direction of the phased array antenna,
   wherein each respective one of the plural phase shifter elements comprises a signal line through-substrate-via (TSV) whose phase shift is configurable using an inductance switch and a capacitance switch in the respective phase shifter element.

24. The method of claim 23, wherein each respective one of the plural phase shifter elements comprises:
   a capacitance control line TSV used to control a capacitance of the signal line TSV; and
   an inductance control line TSV used to control an inductance of the signal line TSV.

25. The method of claim 23, wherein the signal line TSV extends through a substrate from a first side of the substrate to a second side of the substrate.

26. The method of claim 25, wherein the phased array antenna comprises:
   an antenna substrate containing the plural antenna elements, wherein the antenna substrate is on the first side of the substrate; and
   a heat sink on the second side of the substrate.

* * * * *